United States Patent
Zhang et al.

(10) Patent No.: US 12,227,241 B2
(45) Date of Patent: Feb. 18, 2025

(54) METHOD AND APPARATUS FOR LATERAL CONTROL OF VEHICLE, STORAGE MEDIUM AND VEHICLE

(71) Applicant: Xiaomi EV Technology Co., Ltd., Beijing (CN)

(72) Inventors: Chi Zhang, Beijing (CN); Wei Tan, Beijing (CN); Hao Li, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 161 days.

(21) Appl. No.: 17/890,764

(22) Filed: Aug. 18, 2022

(65) Prior Publication Data

US 2023/0356774 A1    Nov. 9, 2023

(30) Foreign Application Priority Data

May 6, 2022  (CN) .......................... 202210488535.2

(51) Int. Cl.
*B62D 6/00* (2006.01)
*B62D 15/02* (2006.01)

(52) U.S. Cl.
CPC .......... *B62D 6/003* (2013.01); *B62D 15/021* (2013.01); *B62D 15/025* (2013.01)

(58) Field of Classification Search
CPC ..... B62D 6/003; B62D 15/021; B62D 15/025
See application file for complete search history.

(56) References Cited

U.S. PATENT DOCUMENTS

| 2006/0041364 A1* | 2/2006 | Tsukasaki ............. B62D 6/003 701/69 |
| 2007/0039775 A1* | 2/2007 | Matsuno ................ B62D 5/008 180/446 |
| 2008/0091318 A1 | 4/2008 | Deng et al. |
| 2010/0211269 A1 | 8/2010 | Yasutake et al. |
| 2014/0229068 A1* | 8/2014 | Ueyama ................ B60W 10/20 701/41 |

(Continued)

FOREIGN PATENT DOCUMENTS

| CN | 207328574 U | 5/2018 |
| CN | 109850012 A | 6/2019 |
| CN | 110531750 A | 12/2019 |

(Continued)

OTHER PUBLICATIONS

"Pure Pursuit," Web page https://thomasfermi.github.io/Algorithms-for-Automated-Driving/Control/PurePursuit.html, 4 pgs. , May 9, 2021.

(Continued)

*Primary Examiner* — George C Jin
(74) *Attorney, Agent, or Firm* — Volpe Koenig (57) ABSTRACT

A method for lateral control of a vehicle includes: determining a target steering wheel rotation angle based on a target trajectory of the vehicle and a vehicle pose; determining a steering wheel rotation angle compensation according to the target steering wheel rotation angle and steering data of the vehicle; and controlling steering of the vehicle according to the target steering wheel rotation angle and the steering wheel rotation angle compensation, such that an actual steering angle of the vehicle is consistent with the target steering wheel rotation angle.

16 Claims, 4 Drawing Sheets

(56) References Cited

U.S. PATENT DOCUMENTS

2019/0217854 A1* 7/2019 Park .................... B60W 30/045
2020/0391726 A1 12/2020 Qin et al.

FOREIGN PATENT DOCUMENTS

| | | |
|---|---|---|
| CN | 111038583 A | 4/2020 |
| CN | 111610780 A | 9/2020 |
| CN | 111873991 A | 11/2020 |
| CN | 111897344 A | 11/2020 |
| CN | 112208515 A | 1/2021 |
| CN | 112519882 A | 3/2021 |
| CN | 113415276 A | 9/2021 |
| CN | 113428134 A | 9/2021 |
| CN | 113848899 A | 12/2021 |
| CN | 114906145 A | 8/2022 |
| EP | 1097855 A2 | 5/2001 |
| EP | 2949546 A2 | 12/2015 |
| JP | 2015189410 A | 11/2015 |
| JP | 2016175446 A | 10/2016 |

OTHER PUBLICATIONS

J.M. Snider, "Automatic Steering Methods for Autonomous Automobile Path Tracking", CMU-RI-TR-09-08, Feb. 2009 Robotics Institute, 78 pgs., Carnegie Mellon University, Pittsburgh, Pennsylvania.

Extended European Search Report issued on May 23, 2023 for European Patent Application No. 22193126.

* cited by examiner

METHOD AND APPARATUS FOR LATERAL CONTROL OF VEHICLE, STORAGE MEDIUM AND VEHICLE

CROSS REFERENCE TO RELATED APPLICATIONS

The present application is proposed based on and claims priority to Chinese Patent Application No. 2022104885352 and filed on May 6, 2022, the entire contents of which are incorporated herein by reference.

BACKGROUND

An unmanned vehicle is a complex system with combination of software and hardware, and its software algorithm modules mainly include perception, positioning, trajectory prediction, behavioral decision-making, motion planning, feedback control and the like. Among them, feedback control is a lowest-level software algorithm module of the unmanned vehicle, including lateral control and longitudinal control. Lateral control is mainly used to control a steering wheel of a vehicle, and longitudinal control is mainly responsible for the control of an accelerator and brake of the vehicle. Lateral control and longitudinal control work together to make the unmanned vehicle travel according to a predetermined reference trajectory (target trajectory). Roughly, lateral control performs tracking control according to a path, curvature and other information output by upper-level motion planning, so as to reduce tracking errors and meanwhile ensure traveling stability and comfort of the vehicle.

SUMMARY

According to a first aspect of examples of the disclosure, a method for lateral control of a vehicle is provided, including:
  determining a target steering wheel rotation angle based on a target trajectory of the vehicle and a vehicle pose;
  determining a steering wheel rotation angle compensation according to the target steering wheel rotation angle and steering data of the vehicle; and
  controlling steering of the vehicle according to the target steering wheel rotation angle and the steering wheel rotation angle compensation, such that an actual steering angle of the vehicle is consistent with the target steering wheel rotation angle.

According to a second aspect of examples of the disclosure, an apparatus for lateral control of a vehicle is provided, including:
  a processor; and
  a memory for storing an instruction capable of being executed by the processor.

The processor is configured to:
  determine a target steering wheel rotation angle based on a target trajectory of the vehicle and a vehicle pose;
  determine a steering wheel rotation angle compensation according to the target steering wheel rotation angle and steering data of the vehicle; and
  control steering of the vehicle according to the target steering wheel rotation angle and the steering wheel rotation angle compensation, such that an actual steering angle of the vehicle is consistent with the target steering wheel rotation angle.

According to a third aspect of examples of the disclosure, a non-transitory computer readable storage medium is provided, storing a computer program instruction. The program instruction, in response to being executed by a processor, implements the steps of the method for lateral control of the vehicle provided by the first aspect of the disclosure.

According to a fourth aspect of an example of the disclosure, a vehicle is provided. The vehicle includes the apparatus for lateral control of the vehicle provided by the second aspect or the third aspect of the disclosure.

It should be understood that both the foregoing general description and the following detailed description are used as examples and are explanatory merely, without any limitation to the disclosure.

BRIEF DESCRIPTION OF THE DRAWINGS

The accompanying drawings here, which are incorporated in and constitute a part of the specification, illustrate examples consistent with the disclosure, and together with the description serve to explain the principles of the disclosure.

DETAILED DESCRIPTION

Examples will be described in detail here, instances of which are represented in the accompanying drawings. When the following description refers to the accompanying drawings, the same numerals in different accompanying drawings refer to the same or similar elements unless otherwise indicated. The implementations described in the following examples do not represent all implementations consistent with the disclosure. Rather, they are merely instances of apparatuses and methods consistent with some aspects of the disclosure as detailed in the appended claims.

It should be noted that all actions of acquiring signals, information or data in the present disclosure are carried out under the premise of complying with corresponding data protection regulations and policies of the country where they are located, and under a condition that corresponding apparatus owner grants authorization.

In the related art, lateral control algorithms include a Pure Pursuit control algorithm based on a vehicle kinematic model, a linear quadratic regulator (LQR) control algorithm or a model predictive control (MPC) algorithm based on a vehicle dynamic model, etc. A target rotation angle calculated by adopting these control algorithms is executed by an electric power steering (EPS) actuator to achieve lateral control. However, in an actual control process, due to objective factors such as insufficient small-angle execution accuracy of the EPS of a steering system, response delay, and a physical structural gap of the vehicle steering system, a problem of insufficient steering response accuracy will be caused, and consequently, the vehicle does not produce sufficient steering behavior (as reflected in the vehicle's yaw velocity) as expected by the vehicle dynamic/kinematic model in the control algorithms, so accumulatively, the lateral control algorithm will increase an adjustment control amount next time, resulting in periodic adjustment of swing angle control and thus a phenomenon of wriggling of a steering wheel and even the vehicle.

Figure 1:
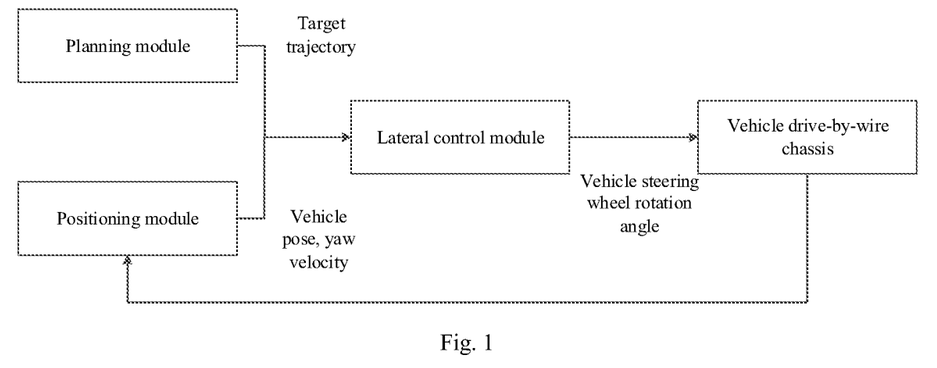
FIG. 1 is a schematic diagram of lateral control planning of a vehicle illustrated according to an example.

In the related art, as shown in FIG. 1, a lateral control module receives a target trajectory output by a current planning module (i.e. a route planning module) as well as a current vehicle location and pose, and a yaw velocity output by a positioning module, calculates a lateral location deviation and a heading angle deviation between a current vehicle and the target trajectory, and calculates an expected vehicle steering behavior according to methods such as LQR, MPC and Pure Pursuit. The steering behavior of the vehicle is calculated based on a vehicle kinematic/dynamic model. These two models may be used to estimate a steering wheel rotation angle of the vehicle and a corresponding yaw velocity (heading angle change rate) of the vehicle, and may control the vehicle to change a heading direction and a location according to a calculated target steering wheel rotation angle of the vehicle and the corresponding yaw velocity (heading angle change rate) of the vehicle, so that the vehicle is closer to the target trajectory. The target rotation angle calculated by adopting these control algorithms is executed by an electric power steering (EPS) actuator to achieve lateral control. However, in an actual control process, due to objective factors such as insufficient small-angle execution accuracy of the EPS of a steering system, response delay, and a physical structural gap of the vehicle steering system, a problem of insufficient steering response accuracy will be caused, and consequently, the vehicle does not produce sufficient steering behavior (as reflected in the vehicle's yaw velocity) as expected by the vehicle dynamic/kinematic model in the control algorithms, so accumulatively, the lateral control algorithm will increase an adjustment control amount next time, resulting in periodic adjustment of swing angle control and thus a phenomenon of wriggling of a steering wheel and even the vehicle.

In view of this, examples of the disclosure provide a method and apparatus for lateral control of a vehicle, a storage medium and the vehicle, so as to solve the problems in the related art.

The disclosure relates to the technical field of automatic driving, in particular to a method and apparatus for lateral control of a vehicle, a storage medium and the vehicle.

Figure 2:
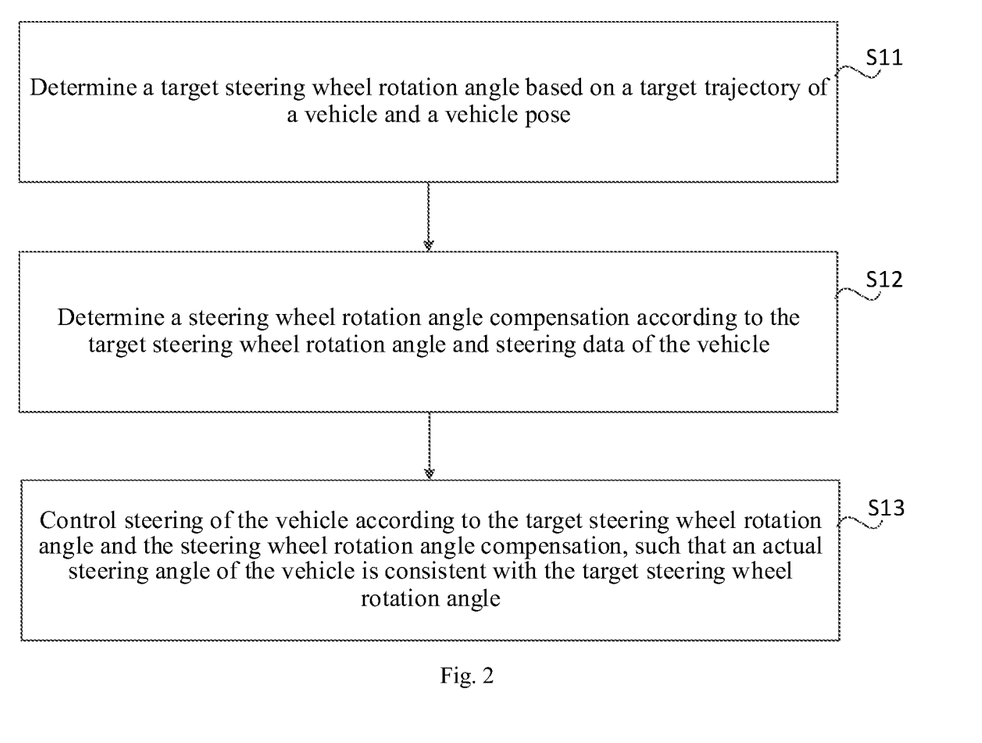
FIG. 2 is a flow chart of a method for lateral control of a vehicle illustrated according to an example.

FIG. 2 is a flow chart of a method for lateral control of a vehicle illustrated according to an example. As shown in FIG. 2, the method for lateral control of the vehicle is applied to a control terminal of an autonomous vehicle. The method for lateral control of the vehicle includes the following steps.

In step S11, a target steering wheel rotation angle is determined based on a target trajectory of the vehicle and a vehicle pose.

In some implementations, determining the target steering wheel rotation angle based on the target trajectory of the vehicle and the vehicle pose includes: the target steering wheel rotation angle is determined according to the target trajectory and the vehicle pose through a path tracking control algorithm based on a kinematic model; or the target steering wheel rotation angle is determined according to the target trajectory and the vehicle pose through a path tracking control algorithm based on a dynamic model.

For example, the path tracking control algorithm based on the kinematic model may be a Pure Pursuit control algorithm based on a vehicle kinematic model, and the path tracking control algorithm based on the dynamic model may be a linear quadratic regulator (LQR) control algorithm or a model predictive control (MPC) algorithm based on a vehicle dynamic model.

Through a path tracking control method modeled based on the kinematic or dynamic model, the target steering wheel rotation angle steer_target_original may be calculated according to the target trajectory and the vehicle pose. For a specific calculating method, reference may be made to relevant technical principles of any one of path tracking control algorithms in the aforesaid examples, which will not be repeated here.

In step S12, a steering wheel rotation angle compensation is determined according to the target steering wheel rotation angle and steering data of the vehicle.

In some implementations, the steering data may include an actual yaw velocity of the vehicle. The actual yaw velocity of the vehicle may be obtained from a positioning feedback module (apparatus) of the vehicle. The actual steering wheel rotation angle of the vehicle may be determined according to the actual yaw velocity of the vehicle. The steering wheel rotation angle compensation may be determined according to an actual steering angle of the vehicle and the target steering wheel rotation angle.

In step S13, steering of the vehicle is controlled according to the target steering wheel rotation angle and the steering wheel rotation angle compensation, such that an actual steering angle of the vehicle is consistent with the target steering wheel rotation angle.

In some implementations, controlling steering of the vehicle according to the target steering wheel rotation angle and the steering wheel rotation angle compensation includes: steering of the vehicle is controlled according to a sum value of the target steering wheel rotation angle and the steering wheel rotation angle compensation.

For example, the sum value of the target steering wheel rotation angle and the steering wheel rotation angle compensation is calculated, the sum value is sent to EPS of a steering system for execution, so as to control the actual steering angle (i.e. steering angles of wheels) to reach the target steering wheel rotation angle.

By adopting such a solution, under a vehicle lateral control scenario, the target steering wheel rotation angle of the vehicle may be determined according to the target trajectory of the vehicle and the vehicle pose. The steering wheel rotation angle compensation is determined according to the target steering wheel rotation angle and the steering data of the vehicle. The steering of the vehicle is controlled according to the target steering wheel rotation angle and the steering wheel rotation angle compensation, such that the actual steering angle of the vehicle is consistent with the target steering wheel rotation angle. By adopting such a solution, a problem of insufficient steering response accuracy caused by objective factors such as insufficient small-angle execution accuracy of EPS of the steering system, response delay, and a physical structural gap of the vehicle steering system may be avoided through the steering wheel rotation angle compensation, such that the vehicle may produce a sufficient steering behavior as expected by a vehicle dynamic/kinematic model in control algorithms. Thus, the actual steering angle of the vehicle is consistent with the target steering wheel rotation angle, so a phenomenon of wriggling of the steering wheel/vehicle is avoided.

In some examples, the steering data include an actual yaw velocity of the vehicle, and determining the steering wheel rotation angle compensation according to the target steering wheel rotation angle and the steering data of the vehicle includes:

a target yaw velocity corresponding to the target steering wheel rotation angle is determined; and the steering wheel rotation angle compensation is determined according to the target yaw velocity and the actual yaw velocity based on a preset proportional derivative control strategy.

For example, the target yaw velocity omega_target corresponding to the target steering wheel rotation angle steer_target_original is determined. The steering wheel rotation angle compensation steer_compensation may be determined according to the target yaw velocity omega_target and the actual yaw velocity omega_act.

In some examples, under a condition that the adopted path tracking control algorithm is the path tracking control algorithm based on the kinematic model, determining the target yaw velocity corresponding to the target steering wheel rotation angle includes:

the target yaw velocity is determined according to the target steering wheel rotation angle, and a current vehicle speed, a vehicle wheelbase and a steering transmission ratio in the steering data.

For example, the target yaw velocity omega_target may be calculated through the following calculation formula:

$$\text{omega\_target} = \text{velocity} \times \tan\left(\frac{\text{steer\_target\_origina}}{\text{steer\_ratio}}\right) \div \text{wheelbase}$$

where, velocity represents the current vehicle speed, with a unit being m/s (meter per second); wheelbase represents the vehicle wheelbase, with a unit being m (meter); steer_target_original represents the target steering wheel rotation angle; and steer_ratio represents the steering transmission ratio.

It is worth explaining that the steering transmission ratio refers to a ratio of a steering degree of the steering wheel to a steering degree of the wheels. The steering transmission ratio may be obtained by measurement through experiments or may be obtained by performing a simulation test on the vehicle.

In some examples, under a condition that the adopted path tracking control algorithm is the path tracking control algorithm based on the dynamic model, determining the target yaw velocity corresponding to the target steering wheel rotation angle includes:

the target yaw velocity is determined according to the target steering wheel rotation angle, and the current vehicle speed, the vehicle wheelbase, the steering transmission ratio and a dynamic factor in the steering data. The dynamic factor is determined according to at least one of vehicle mass, cornering stiffness of a vehicle rear axle, a distance from a center of mass of the vehicle to a front axle, cornering stiffness of the vehicle front axle, a distance from the center of mass of the vehicle to the rear axle, the current vehicle speed, and the vehicle wheelbase.

For example, the target yaw velocity omega_target may be calculated through the following calculation formula:

$$\text{omega\_target} = \\ \text{velocity} \times \tan\left(\frac{\text{steer\_target\_origina}}{\text{steer\_ratio}}\right) \div \text{wheelbase} \times \text{dynamic\_factor}$$

where $$\text{dynamic\_factor} = \frac{1}{1 - \frac{\text{mass} \times (cf \times lf - cr \times lr) \times \text{velocity}^2}{\text{wheel\_base}^2 \times cf \times cr}}$$

Where, mass represents the vehicle mass, with a unit being kg (kilogram); lf represents the distance from the center of mass of the vehicle to the front axle, with a unit being m (meter); lr represents the distance from the center of mass of the vehicle to the rear axle, with a unit being m (meter); cf represents the cornering stiffness of the vehicle front axle, with a unit being N/rad (N/radian); and cr represents the cornering stiffness of the vehicle rear axle, with a unit being N/rad (N/radian).

It is worth explaining that the cornering stiffness refers to a ratio of tire cornering force to a cornering angle.

In some examples, determining the steering wheel rotation angle compensation according to the target yaw velocity and the actual yaw velocity based on the preset proportional derivative control strategy includes:

a yaw velocity adjustment amount is determined according to the target yaw velocity and the actual yaw velocity; and the steering wheel rotation angle compensation corresponding to the yaw velocity adjustment amount is determined based on the preset proportional derivative control strategy.

In some implementations, the yaw velocity adjustment amount may be determined according to the target yaw velocity and the actual yaw velocity. For example, a difference between the target yaw velocity and the actual yaw velocity may be directly determined to be the yaw velocity adjustment amount.

In some other implementations, determining the yaw velocity adjustment amount according to the target yaw velocity and the actual yaw velocity may include:

a yaw velocity error is obtained by calculating a difference between the target yaw velocity and the actual yaw velocity; a minimum value between the yaw velocity error and a preset yaw velocity error upper limit is determined to be a candidate yaw velocity adjustment amount; and a maximum value between the candidate yaw velocity adjustment amount and a preset yaw velocity error lower limit is determined to be the yaw velocity adjustment amount.

For example, the difference between the target yaw velocity omega_target and the actual yaw velocity omega_act may be calculated through a formula omega_error_1=omega_target−omega_act, and the yaw velocity error omega_error_1 may be obtained. The minimum value, namely min(omega_error_1, omega_error_max), between the yaw velocity error omega_error_1 and the preset yaw velocity error upper limit omega_error_max is determined to be the candidate yaw velocity adjustment amount. The maximum value, namely, max(min(omega_error,omega_error_max),omega_error_min), between the candidate yaw velocity adjustment amount min(omega_error_1, omega_error_max) and the preset yaw velocity error lower limit omega_error_min is determined to be the yaw velocity adjustment amount omega_error.

Here, omega_error_max and omega_error_min are control parameters, and are maximum and minimum yaw velocity deviations preset under different vehicle speeds. For example, omega_error_max may be +0.0175, and omega_error_min may be −0.0175.

After determining the yaw velocity adjustment amount omega_error, the steering wheel rotation angle compensation steer_compensation corresponding to the yaw velocity adjustment amount omega_error may be calculated based on the preset proportional derivative control strategy.

For example, determining the steering wheel rotation angle compensation corresponding to the yaw velocity adjustment amount based on the preset proportional derivative control strategy includes:

a first candidate steering wheel rotation angle compensation is determined according to a preset proportional control parameter, a preset derivative control parameter, the yaw velocity adjustment amount, a control cycle, and a yaw velocity adjustment amount calculated in a previous control cycle; a minimum value between the first candidate steering wheel rotation angle compensation and a preset steering wheel rotation angle compensation upper limit is determined to be a second candidate steering wheel rotation angle compensation; and a maximum value between the second candidate steering wheel rotation angle compensation and a preset steering wheel rotation angle compensation lower limit is determined to be the steering wheel rotation angle compensation.

For example, the first candidate steering wheel rotation angle compensation steer_pd_1 may be calculated through the following formula according to the preset proportional control parameter, the preset derivative control parameter, the yaw velocity adjustment amount, the control cycle, and the yaw velocity adjustment amount calculated in the previous control cycle:

$$steer\_pd\_1 = kp \times omega\_error + kd \times (omega\_error - last\_omega\_error) \div Ts,$$

where kp represents the preset proportional control parameter; kd represents preset derivative control parameter, last_omega_error represents the yaw velocity adjustment amount calculated in the previous control cycle, and Ts represents the control cycle. Among them, kp and kd are experience values.

After determining the first candidate steering wheel rotation angle compensation steer_pd_1, the minimum value, namely, min(steer_pd,steer_compensation_max), between the first candidate steering wheel rotation angle compensation steer_pd_1 and the preset steering wheel rotation angle compensation upper limit steer_compensation_max is determined to be the second candidate steering wheel rotation angle compensation. The maximum value, namely, max(min(steer_pd, steer_compensation_max),steer_compensation_min), between the second candidate steering wheel rotation angle compensation min(steer_pd, steer_compensation_max) and the preset steering wheel rotation angle compensation lower limit steer_compensation_min is determined to be the steering wheel rotation angle compensation steer_compensation.

Among them, steer_compensation_max and steer_compensation_min are experience values. For example, steer_compensation_max is +1 degree, and steer_compensation_min is −1 degree.

After determining the steering wheel rotation angle compensation steer_compensation, a sum value steer_target_original+steer_compensation of the target steering wheel rotation angle steer_target_original and the steering wheel rotation angle compensation steer_compensation may be calculated, and steering of the vehicle is controlled according to the sum value, such that the actual steering angle (i.e. steering angles of wheels) of the vehicle is consistent with the target steering wheel rotation angle.

It should be noted that the calculation formula in the above example is merely a calculation manner shown as an example to explain the technical solution of the disclosure, and is not used to limit the disclosure. In some implementations, a weight coefficient may be added to each parameter in the calculation formula in the foregoing example.

The disclosure determines whether the vehicle moves according to a steering expectation through a feedback closed-loop manner based on the yaw velocity of the vehicle. Thus, the situation that in the related art, a steering angle is directly issued without considering whether a vehicle correctly executes the steering angle to produce expected yaw, which causes a problem that the steering expectation is not correctly executed due to insufficient steering response accuracy, mechanical gap delay or other undesirable features can be avoided, so that a problem of wriggling caused by repeated adjustment of a steering direction is avoided. According to the disclosure, based on closed-loop feedback of the yaw velocity, after compensating the steering wheel rotation angle, response to small-angle steering of the vehicle will be faster, a dynamic response is faster, and thus a path tracking precision can be improved.

Figure 3:
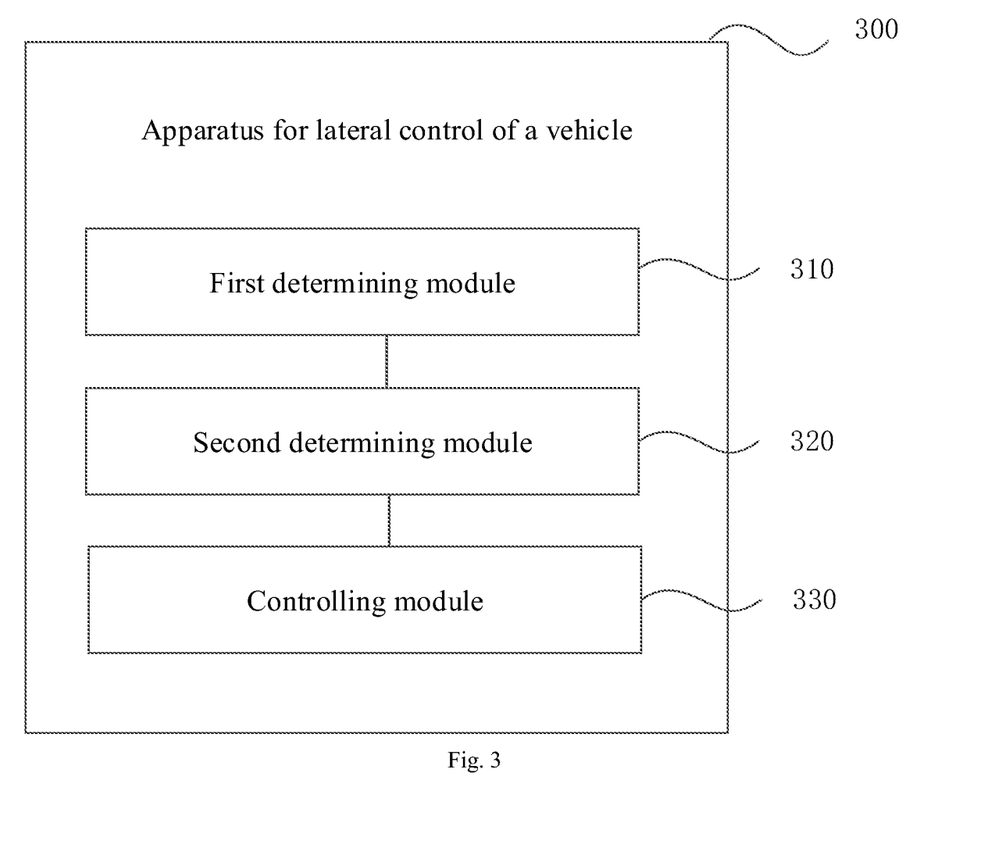
FIG. 3 is a block diagram of an apparatus for lateral control of a vehicle illustrated according to an example.

FIG. 3 is a block diagram of an apparatus for lateral control of a vehicle illustrated according to an example. Referring to FIG. 3, the apparatus for lateral control of a vehicle 300 includes:

a first determining module 310, configured to determine a target steering wheel rotation angle based on a target trajectory of the vehicle and a vehicle pose;

a second determining module 320, configured to determine a steering wheel rotation angle compensation according to the target steering wheel rotation angle and steering data of the vehicle; and a controlling module 330, configured to control steering of the vehicle according to the target steering wheel rotation angle and the steering wheel rotation angle compensation, such that an actual steering angle of the vehicle is consistent with the target steering wheel rotation angle.

By adopting the above apparatus, under a vehicle lateral control scenario, the target steering wheel rotation angle of the vehicle may be determined according to the target trajectory of the vehicle and the vehicle pose. The steering wheel rotation angle compensation is determined according to the target steering wheel rotation angle and the steering data of the vehicle. The steering of the vehicle is controlled according to the target steering wheel rotation angle and the steering wheel rotation angle compensation, such that the actual steering angle of the vehicle is consistent with the target steering wheel rotation angle. By adopting such a solution, a problem of insufficient steering response accuracy caused by objective factors such as insufficient small-angle execution accuracy of EPS of a steering system, response delay, and a physical structural gap of the vehicle steering system may be avoided through the steering wheel rotation angle compensation, such that the vehicle may produce a sufficient steering behavior as expected by a vehicle dynamic/kinematic model in control algorithms. Thus, the actual steering angle of the vehicle is consistent with the target steering wheel rotation angle, so a phenomenon of wriggling of the steering wheel/vehicle is avoided.

In some examples, the steering data include an actual yaw velocity of the vehicle, and the second determining module 320 includes:

a first determining sub-module, configured to determine a target yaw velocity corresponding to the target steering wheel rotation angle; and a second determining sub-module, configured to determine the steering wheel rotation angle compensation according to the target yaw velocity and the actual yaw velocity based on a preset proportional derivative control strategy.

In some examples, the first determining module is configured to determine the target steering wheel rotation angle according to the target trajectory and the vehicle pose through a path tracking control algorithm based on a kinematic model; and the first determining sub-module is configured to determine the target yaw velocity according to the target steering wheel rotation angle, and a current vehicle speed, a vehicle wheelbase and a steering transmission ratio in the steering data.

In some examples, the first determining module is configured to determine the target steering wheel rotation angle according to the target trajectory and the vehicle pose through a path tracking control algorithm based on a dynamic model; and the first determining sub-module is configured to determine the target yaw velocity according to the target steering wheel rotation angle, and a current vehicle speed, a vehicle wheelbase, a steering transmission ratio and a dynamic factor in the steering data.

In some examples, the dynamic factor is determined according to at least one of: vehicle mass, cornering stiffness of a vehicle rear axle, a distance from a center of mass of the vehicle to a front axle, cornering stiffness of the vehicle front axle, a distance from the center of mass of the vehicle to the rear axle, the current vehicle speed, and the vehicle wheelbase.

In some examples, the second determining sub-module includes:

a third determining sub-module, configured to determine a yaw velocity adjustment amount according to the target yaw velocity and the actual yaw velocity; and a fourth determining sub-module, configured to determine the steering wheel rotation angle compensation corresponding to the yaw velocity adjustment amount based on the preset proportional derivative control strategy.

In some examples, the third determining sub-module is configured to obtain a yaw velocity error by calculating a difference between the target yaw velocity and the actual yaw velocity; determine a minimum value between the yaw velocity error and a preset yaw velocity error upper limit to be a candidate yaw velocity adjustment amount; and determine a maximum value between the candidate yaw velocity adjustment amount and a preset yaw velocity error lower limit to be the yaw velocity adjustment amount.

In some examples, the fourth determining sub-module is configured to determine a first candidate steering wheel rotation angle compensation according to a preset proportional control parameter, a preset derivative control parameter, the yaw velocity adjustment amount, a control cycle, and a yaw velocity adjustment amount calculated in a previous control cycle; determine a minimum value between the first candidate steering wheel rotation angle compensation and a preset steering wheel rotation angle compensation upper limit to be a second candidate steering wheel rotation angle compensation; and determine a maximum value between the second candidate steering wheel rotation angle compensation and a preset steering wheel rotation angle compensation lower limit to be the steering wheel rotation angle compensation.

In some examples, the controlling module 330 includes:

a controlling sub-module, configured to control steering of the vehicle according to a sum value of the target steering wheel rotation angle and the steering wheel rotation angle compensation.

Regarding the apparatus in the foregoing example, specific manners in which all the modules execute operations have been described in detail in the example related to the method, and will not be described in detail here.

The disclosure further provides a non-transitory computer readable storage medium, storing a computer program instruction. The program instruction, in response to being executed by a processor, implements the steps of the method for lateral control of the vehicle provided by the disclosure.

Figure 4:
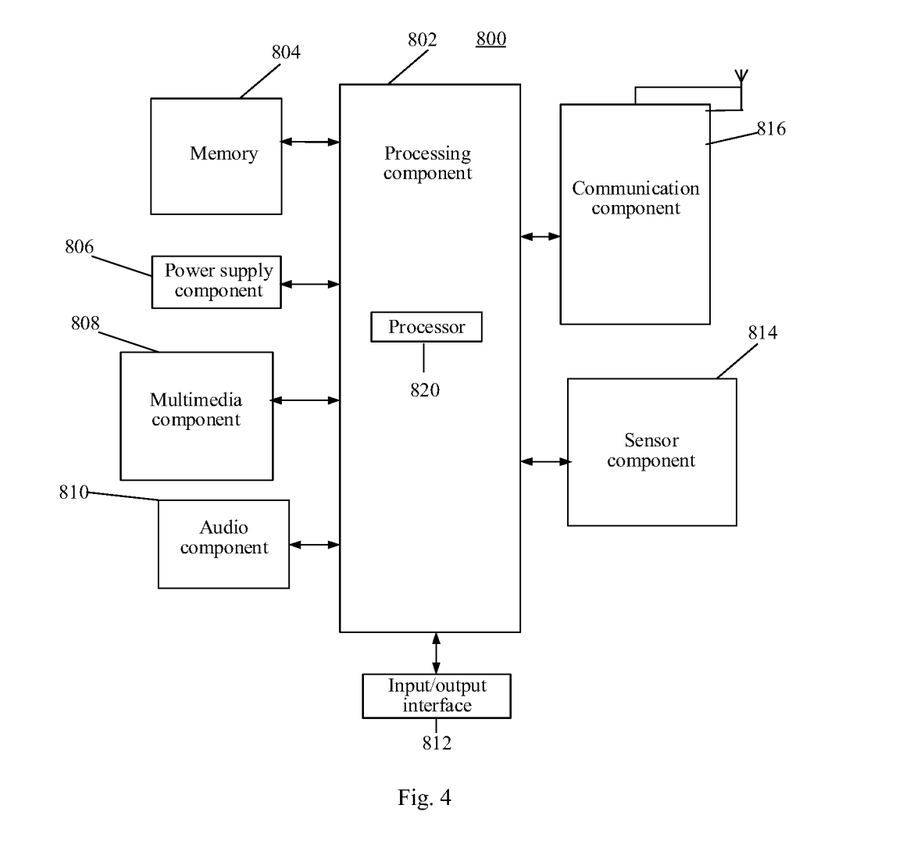
FIG. 4 is a block diagram of an apparatus used for lateral control of a vehicle illustrated according to an example.

FIG. 4 is a block diagram of an apparatus 800 for lateral control of a vehicle illustrated according to an example. For instance, the apparatus 800 may be a mobile phone, a computer, a digital broadcasting terminal, a messaging device, a game console, a tablet device, a medical device, a fitness device, a personal digital assistant, etc.

With reference to FIG. 4, the apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operations of the apparatus 800, such as operations associated with display, telephone calling, data communication, camera operations, and recording operations. The processing component 802 may include one or more processors 820 to execute instructions to complete all or part of steps of the above method for lateral control of the vehicle. In addition, the processing component 802 may include one or more modules to facilitate interaction between the processing component 802 and other components. For instance, the processing component 802 may include a multimedia module to facilitate interaction between the multimedia component 808 and the processing component 802.

The memory 804 is configured to store various types of data to support operations on the apparatus 800. Instances of these data include instructions for any application program or method operated on the apparatus 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 provides electric power to various components of the apparatus 800. The power supply component 806 may include a power management system, one or more power supplies, and other components associated with generation, management, and distribution of the electric power for the apparatus 800.

The multimedia component 808 includes a screen that provides an output interface between the apparatus 800 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, wipe, and gestures on the touch panel. The touch sensor may sense a boundary of a touch or wipe action, and may also detect a duration and pressure related to a touch or wipe operation. In some examples, the multimedia component 808 includes a front camera and/or a rear camera. When the apparatus 800 is in an operation mode, such as a shooting mode or a video mode, the front camera and/or the rear camera may receive external multimedia data. Each front camera and rear camera may be a fixed optical lens system or have focal length and optical zoom capabilities.

The audio component 810 is configured to output and/or input audio signals. For instance, the audio component 810 includes a microphone (MIC). When the apparatus 800 is in the operation mode, such as a call mode, a recording mode, and a voice recognition mode, the microphone is configured to receive external audio signals. The received audio signals may be further stored in the memory 804 or sent via the communication component 816. In some examples, the audio component 810 further includes a speaker for outputting the audio signals.

The I/O interface 812 provides an interface between the processing component 802 and a peripheral interface module. The above peripheral interface module may be a keyboard, a click wheel, buttons, etc. These buttons may include but are not limited to: a home button, a volume button, a start button, and a lock button.

The sensor component 814 includes one or more sensors to provide the apparatus 800 with various aspects of status assessment. For instance, the sensor component 814 may detect an on/off status of the apparatus 800 and relative positioning of the component. For instance, the component is a display and a keypad of the apparatus 800. The sensor component 814 may also detect a position change of the apparatus 800 or one component of the apparatus 800, presence or absence of contact between the user and the apparatus 800, orientation or acceleration/deceleration of the apparatus 800, and a temperature change of the apparatus 800. The sensor component 814 may include a proximity sensor configured to detect presence of a nearby object when there is no physical contact. The sensor component 814 may also include a light sensor, such as a CMOS or CCD image sensor, for use in imaging applications. In some examples, the sensor component 814 may also include an acceleration sensor, a gyroscope sensor, a magnetic sensor, a pressure sensor or a temperature sensor.

The communication component 816 is configured to facilitate wired or wireless communication between the apparatus 800 and other devices. The apparatus 800 may access a wireless network based on a communication standard, such as WiFi, 2G or 3G, or their combination. In an example, the communication component 816 receives a broadcast signal or broadcast related information from an external broadcast management system via a broadcast channel. In an example, the communication component 816 further includes a near field communication (NFC) module to facilitate short-range communication. For instance, the NFC module may be implemented based on a radio frequency identification (RFID) technology, an infrared data association (IrDA) technology, an ultra-wideband (UWB) technology, a Bluetooth® (BT) technology and other technologies.

In an example, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, so as to execute the above method for lateral control of the vehicle.

In an example, a non-transitory computer-readable storage medium including instructions is further provided, for instance, a memory 804 including instructions. The above instructions may be executed by a processor 820 of the apparatus 800 to complete the above method of lateral control of the vehicle. For instance, the non-transitory computer-readable storage medium may be an ROM, a random access memory (RAM), a CD-ROM, a magnetic tape, a floppy disk, an optical data storage device, etc.

In another example, a computer program product is further provided. The computer program product contains a computer program capable of being executed by a programmable apparatus. The computer program has a code part that, in response to being executed by the programmable apparatus, is used for executing the above method for lateral control of the vehicle.

In an example of the disclosure, a vehicle is further provided. The vehicle includes any one of the apparatuses for lateral control of the vehicle in the aforesaid examples.

After considering the specification and practicing the disclosure, those of skill in the art will easily think of other implementation solutions of the disclosure. The present disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The specification and the examples are regarded as examples merely, and the true scope and spirit of the disclosure are pointed out by the appended claims.

It should be understood that the disclosure is not limited to the precise structure that has been described above and shown in the accompanying drawings, and various modifications and changes can be made without departing from its scope. The scope of the disclosure is merely limited by the appended claims.

What is claimed is:

1. A method for lateral control of a vehicle, comprising:
    determining a target steering wheel rotation angle based on a target trajectory of the vehicle and a vehicle pose;
    determining a steering wheel rotation angle compensation according to the target steering wheel rotation angle and steering data of the vehicle, wherein the steering data comprises an actual yaw velocity of the vehicle, and determining the steering wheel rotation angle compensation further comprises
        determining a target yaw velocity corresponding to the target steering wheel rotation angle, and
        determining the steering wheel rotation angle compensation according to the target yaw velocity and the actual yaw velocity based on a preset proportional derivative control strategy, which comprises
            determining a yaw velocity adjustment amount according to the target yaw velocity and the actual yaw velocity, and
            determining the steering wheel rotation angle compensation corresponding to the yaw velocity adjustment amount based on the preset proportional derivative control strategy; and
    controlling steering of the vehicle according to the target steering wheel rotation angle and the steering wheel rotation angle compensation, such that an actual steering angle of the vehicle is consistent with the target steering wheel rotation angle.

2. The method according to claim 1, wherein determining the target steering wheel rotation angle based on the target trajectory of the vehicle and the vehicle pose comprises:
- determining the target steering wheel rotation angle according to the target trajectory and the vehicle pose through a path tracking control algorithm based on a kinematic model; and
- determining the target yaw velocity corresponding to the target steering wheel rotation angle comprises:
  - determining the target yaw velocity according to the target steering wheel rotation angle, and a current vehicle speed, a vehicle wheelbase and a steering transmission ratio in the steering data.

3. The method according to claim 1, wherein determining the target steering wheel rotation angle based on the target trajectory of the vehicle and the vehicle pose comprises:
- determining the target steering wheel rotation angle according to the target trajectory and the vehicle pose through a path tracking control algorithm based on a dynamic model; and
- determining the target yaw velocity corresponding to the target steering wheel rotation angle comprises:
  - determining the target yaw velocity according to the target steering wheel rotation angle, and a current vehicle speed, a vehicle wheelbase, a steering transmission ratio and a dynamic factor in the steering data.

4. The method according to claim 3, wherein the dynamic factor is determined according to at least one of vehicle mass, cornering stiffness of a vehicle rear axle, a distance from a center of mass of the vehicle to a vehicle front axle, cornering stiffness of the vehicle front axle, a distance from the center of mass of the vehicle to the vehicle rear axle, the current vehicle speed, and the vehicle wheelbase.

5. The method according to claim 1, wherein determining the yaw velocity adjustment amount according to the target yaw velocity and the actual yaw velocity comprises:
- obtaining a yaw velocity error by calculating a difference between the target yaw velocity and the actual yaw velocity;
- determining a minimum value between the yaw velocity error and a preset yaw velocity error upper limit to be a candidate yaw velocity adjustment amount; and
- determining a maximum value between the candidate yaw velocity adjustment amount and a preset yaw velocity error lower limit to be the yaw velocity adjustment amount.

6. The method according to claim 1, wherein determining the steering wheel rotation angle compensation corresponding to the yaw velocity adjustment amount based on the preset proportional derivative control strategy comprises:
- determining a first candidate steering wheel rotation angle compensation according to a preset proportional control parameter, a preset derivative control parameter, the yaw velocity adjustment amount, a control cycle, and the yaw velocity adjustment amount calculated in a previous control cycle;
- determining a minimum value between the first candidate steering wheel rotation angle compensation and a preset steering wheel rotation angle compensation upper limit to be a second candidate steering wheel rotation angle compensation; and
- determining a maximum value between the second candidate steering wheel rotation angle compensation and a preset steering wheel rotation angle compensation lower limit to be the steering wheel rotation angle compensation.

7. The method according to claim 1, wherein controlling steering of the vehicle according to the target steering wheel rotation angle and the steering wheel rotation angle compensation comprises:
- controlling steering of the vehicle according to a sum value of the target steering wheel rotation angle and the steering wheel rotation angle compensation.

8. An apparatus for lateral control of a vehicle, comprising:
- a processor; and
- a memory for storing an instruction capable of being executed by the processor; wherein the processor is configured to:
  - determine a target steering wheel rotation angle based on a target trajectory of the vehicle and a vehicle pose;
  - determine a steering wheel rotation angle compensation according to the target steering wheel rotation angle and steering data of the vehicle, wherein the steering data comprises an actual yaw velocity of the vehicle, and determining the steering wheel rotation angle compensation further comprises
    - determining a target yaw velocity corresponding to the target steering wheel rotation angle, and
    - determining the steering wheel rotation angle compensation according to the target yaw velocity and the actual yaw velocity based on a preset proportional derivative control strategy, which comprises
      - determining a yaw velocity adjustment amount according to the target yaw velocity and the actual yaw velocity, and
      - determining the steering wheel rotation angle compensation corresponding to the yaw velocity adjustment amount based on the preset proportional derivative control strategy; and
  - control steering of the vehicle according to the target steering wheel rotation angle and the steering wheel rotation angle compensation, such that an actual steering angle of the vehicle is consistent with the target steering wheel rotation angle.

9. The apparatus according to claim 8, wherein the processor is further configured to:
- determine the target steering wheel rotation angle according to the target trajectory and the vehicle pose through a path tracking control algorithm based on a kinematic model; and
- determine the target yaw velocity according to the target steering wheel rotation angle, and a current vehicle speed, a vehicle wheelbase and a steering transmission ratio in the steering data.

10. The apparatus according to claim 8, wherein the processor is further configured to:
- determine the target steering wheel rotation angle according to the target trajectory and the vehicle pose through a path tracking control algorithm based on a dynamic model; and
- determine the target yaw velocity according to the target steering wheel rotation angle, and a current vehicle speed, a vehicle wheelbase, a steering transmission ratio and a dynamic factor in the steering data.

11. The apparatus according to claim 10, wherein the dynamic factor is determined according to at least one of vehicle mass, cornering stiffness of a vehicle rear axle, a distance from a center of mass of the vehicle to a vehicle front axle, cornering stiffness of the vehicle front axle, a distance from the center of mass of the vehicle to the vehicle rear axle, the current vehicle speed, and the vehicle wheelbase.

12. The apparatus according to claim 8, wherein the processor is further configured to:
   obtain a yaw velocity error by calculating a difference between the target yaw velocity and the actual yaw velocity;
   determine a minimum value between the yaw velocity error and a preset yaw velocity error upper limit to be a candidate yaw velocity adjustment amount; and
   determine a maximum value between the candidate yaw velocity adjustment amount and a preset yaw velocity error lower limit to be the yaw velocity adjustment amount.

13. The apparatus according to claim 8, wherein the processor is further configured to:
   determine a first candidate steering wheel rotation angle compensation according to a preset proportional control parameter, a preset derivative control parameter, the yaw velocity adjustment amount, a control cycle, and the yaw velocity adjustment amount calculated in a previous control cycle;
   determine a minimum value between the first candidate steering wheel rotation angle compensation and a preset steering wheel rotation angle compensation upper limit to be a second candidate steering wheel rotation angle compensation; and
   determine a maximum value between the second candidate steering wheel rotation angle compensation and a preset steering wheel rotation angle compensation lower limit to be the steering wheel rotation angle compensation.

14. The apparatus according to claim 8, wherein the processor is further configured to:
   control steering of the vehicle according to a sum value of the target steering wheel rotation angle and the steering wheel rotation angle compensation.

15. A non-transitory computer readable storage medium, storing a computer program instruction, wherein the computer program instruction, in response to being executed by a processor, implements steps of:
   determining a target steering wheel rotation angle based on a target trajectory of a vehicle and a vehicle pose;
   determining a steering wheel rotation angle compensation according to the target steering wheel rotation angle and steering data of the vehicle, wherein the steering data comprises an actual yaw velocity of the vehicle, and determining the steering wheel rotation angle compensation further comprises
      determining a target yaw velocity corresponding to the target steering wheel rotation angle, and
      determining the steering wheel rotation angle compensation according to the target yaw velocity and the actual yaw velocity based on a preset proportional derivative control strategy, which comprises
      determining a yaw velocity adjustment amount according to the target yaw velocity and the actual yaw velocity, and
      determining the steering wheel rotation angle compensation corresponding to the yaw velocity adjustment amount based on the preset proportional derivative control strategy; and
   controlling steering of the vehicle according to the target steering wheel rotation angle and the steering wheel rotation angle compensation, such that an actual steering angle of the vehicle is consistent with the target steering wheel rotation angle.

16. A vehicle, comprising the apparatus for lateral control of the vehicle according to claim 8.

* * * * *

UNITED STATES PATENT AND TRADEMARK OFFICE
CERTIFICATE OF CORRECTION

PATENT NO. : 12,227,241 B2
APPLICATION NO. : 17/890764
DATED : February 18, 2025
INVENTOR(S) : Zhang et al.

It is certified that error appears in the above-identified patent and that said Letters Patent is hereby corrected as shown below:

In the Specification

In Column 1, Line 6, delete "APPLICATIONS" and insert -- APPLICATION --, therefor.
In Column 1, Line 9, delete "No. 2022104885352" and insert -- No. 202210488535.2 --, therefor.
In Column 6, Line 8, delete "Where," and insert -- where, --, therefor.
In Column 8, Line 12, delete "situation that in" and insert -- situation in --, therefor.

In the Claims

In Column 12, Line 49, in Claim 1, delete "comprises" and insert -- comprises: --, therefor.
In Column 12, Line 55, in Claim 1, delete "comprises" and insert -- comprises: --, therefor.
In Column 14, Line 23, in Claim 8, delete "comprises" and insert -- comprises: --, therefor.
In Column 14, Line 29, in Claim 8, delete "comprises" and insert -- comprises: --, therefor.
In Column 16, Line 14, in Claim 15, delete "comprises" and insert -- comprises: --, therefor.
In Column 16, Line 20, in Claim 15, delete "comprises" and insert -- comprises: --, therefor.

Signed and Sealed this
Sixth Day of May, 2025

Coke Morgan Stewart
*Acting Director of the United States Patent and Trademark Office*